United States Patent
Harel

(10) Patent No.: US 9,459,965 B2
(45) Date of Patent: Oct. 4, 2016

(54) PREDICTING STORAGE CAPACITY AND PERFORMANCE REQUIREMENTS OF A BACKUP SOLUTION

(71) Applicant: VMware, Inc., Palo Alto, CA (US)

(72) Inventor: Boaz Harel, Hertzelia Herzliya (IL)

(73) Assignee: VMware, Inc., Palo Alto, CA (US)

( * ) Notice: Subject to any disclaimer, the term of this patent is extended or adjusted under 35 U.S.C. 154(b) by 194 days.

(21) Appl. No.: 14/249,495

(22) Filed: Apr. 10, 2014

(65) Prior Publication Data

US 2015/0293815 A1   Oct. 15, 2015

(51) Int. Cl.
| | |
|---|---|
| *G06F 17/30* | (2006.01) |
| *G06F 11/14* | (2006.01) |
| *G06F 11/30* | (2006.01) |
| *G06F 11/34* | (2006.01) |

(52) U.S. Cl.
CPC ....... *G06F 11/1446* (2013.01); *G06F 11/3034* (2013.01); *G06F 11/3442* (2013.01); *G06F 17/30091* (2013.01); *G06F 11/1453* (2013.01); *G06F 11/3457* (2013.01); *G06F 2201/83* (2013.01)

(58) Field of Classification Search
None
See application file for complete search history.

(56) References Cited

U.S. PATENT DOCUMENTS

| | | | | |
|---|---|---|---|---|
| 8,140,791 B1* | 3/2012 | Greene | ............... | G06F 11/1464 711/162 |
| 8,554,918 B1* | 10/2013 | Douglis | ............... | G06F 11/3485 707/640 |
| 8,959,056 B1* | 2/2015 | Weisgerber | ............. | H04L 67/06 707/653 |
| 2003/0229653 A1* | 12/2003 | Nakanishi | ........... | G06F 11/1451 |
| 2006/0274662 A1* | 12/2006 | Tannenbaum | ........ | H04L 41/022 370/242 |
| 2007/0043715 A1* | 2/2007 | Kaushik | ............ | G06F 17/30864 |
| 2011/0191777 A1* | 8/2011 | Bansal | ...................... | G06F 9/46 718/102 |
| 2013/0110969 A1* | 5/2013 | Wertheimer | ........ | G06F 11/1448 709/216 |

* cited by examiner

*Primary Examiner* — Richard Bowen

(57) ABSTRACT

Techniques are described for predicting the storage capacity and performance requirements for deploying and maintaining a backup solution within an enterprise. In particular, a backup system is described which uses an initial pilot phase, during which the system can gather information about the files and data on each end user's device (i.e., client device) that will be backed up and provide a more realistic estimate and resource planning for the backup solution deployment. This initial pilot phase can be performed before any content is actually backed up from the client devices.

20 Claims, 5 Drawing Sheets

PREDICTING STORAGE CAPACITY AND PERFORMANCE REQUIREMENTS OF A BACKUP SOLUTION

TECHNICAL FIELD

The present disclosure generally relates to storage and backup techniques in computing environments and more particularly relates to predicting the storage capacity and performance requirements in light of potential backup policies within a networked enterprise environment.

BACKGROUND

Enterprise desktop management is one of the most challenging tasks for Information Technology (IT) departments of large organizations today. A typical IT department needs to manage, protect, and distribute software updates and modifications, upgrade operating systems and applications, as well as be able to back up and restore the user's data, applications and settings on demand. One significant issue for IT departments involves the complexity of managing a large number of different desktop instances that exist on the computers of various enterprise users. The sheer number of computers to manage; the proliferation of operating system (OS) images and applications; and the complex set of operations, such as deployment, provisioning, patching, upgrading, installing and managing applications, performing backup and restore operations, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient desktop management without sacrificing end user experience.

There exist a number of backup and recovery solutions that are often utilized by IT departments of large organizations. These backup solutions typically include functions for copying and archiving computer data so that it may be used to restore the original data after a loss event. For example, some backup software running on each end user's computer may periodically backup that user's data (e.g., documents, images, emails, etc.) to a central storage location, which may itself be replicated. If a user's computer subsequently breaks or malfunctions, the user's data could then be retrieved from the central storage location and provided to the user on a new or repaired device.

While these backup and recovery solutions have helped IT departments manage employee data, a number of inefficiencies remain in this space. For example, it is often difficult for IT to predict the storage capacity and performance requirements that are needed to implement an ongoing backup and recovery solution. The centralization and on-going synchronization of thousands of images of users' computers might have a major effect on the enterprise resources. For example, the enterprise network should have enough allocated bandwidth to complete these operations within a reasonable timeframe, and storage should have both allocated capacity to store the snapshots of the images, as well as allocated input/output operations per second (IOPS) for timely and predictable completion times.

Some enterprises use resource calculators or other tools to aid the planning phase. These types of tools typically take into account numerous parameters such as the number of endpoint devices, the network topology, estimated image size, bandwidth and storage parameters, and attempt to produce an estimation of the time required to complete the centralization, average centralizations per week, and potential storage and network bottlenecks that might occur if certain thresholds are not met. However, the estimates of such resource planning tools are often inaccurate due to using generic assumptions and their heuristic nature. In light of these factors and other deficiencies, a more accurate and efficient system for predicting storage capacity and performance requirements is desirable.

DETAILED DESCRIPTION

Figure 1:
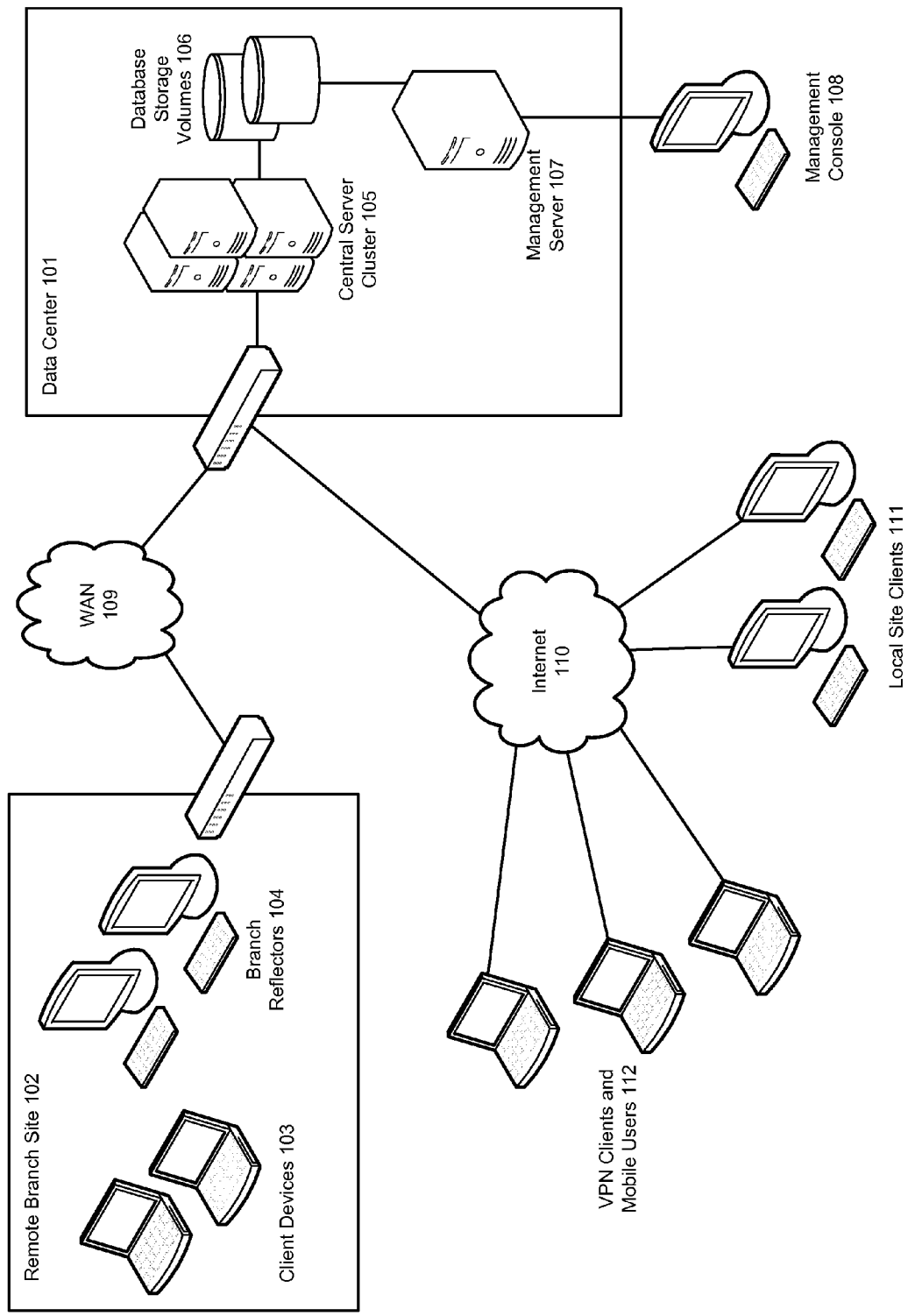
FIG. 1 illustrates an example of an enterprise desktop image management and backup system, in accordance with various embodiments.

Systems and methods in accordance with various embodiments of the present disclosure provide more efficient ways to predict the storage capacity and performance requirements for deploying and maintaining a backup solution or desktop image management system within an enterprise. In particular, embodiments described herein enable the system to perform an initial pilot phase or "dry run" mode, during which the system can gather information about the files and data on each end user's device (i.e., client device) that will be backed up and provide a more realistic estimate and resource planning for the backup solution deployment. This initial pilot phase can be performed before any content is actually backed up from the client devices.

In various embodiments, the system comprises an agent installed and operating on each client device, which is responsible for collecting detailed information about the files and data on that device and sending the information to a central server. During the initial pilot phase, each agent can periodically transmit to the central server a manifest that identifies a listing of all files located on the client device, without actually transmitting the content of those files. The manifest can contain information such as the identifier of each file located on the client device, a unique digital signature of the file and the size of the file. The size of the manifest can be small relative to the actual content of the files and as such, the operations of transmitting the manifests would have little impact on the client, the server or the network. In one embodiment, the manifests are sent at short intervals and include all the files on a machine (or all files which are to be backed up).

Once the server has compiled enough manifests (e.g., a predetermined number of manifests), it can compute the storage capacity and/or performance requirements for backing up all client devices to the central server. For example, the server can analyze the manifests received from the client devices to determine the amount of unique data stored across all of the client devices. Since file-level and/or block-level deduplication is utilized by the server in at least some embodiments, the server can compute the storage capacity that will be needed to back up the data of all the client devices to the server based on the amount of total unique data. Furthermore, based on the frequency of changes per machine (i.e. client device), the server can compute the Input/Output Operations Per Second (IOPS) requirements for implementing an ongoing backup solution in the environment. In at least some embodiments, the storage capacity and/or performance requirements can be affected by the protection policy that specifies which files are to be backed up on each client device. For example, if the protection policy specifies that a large number of files on each client is to be backed up, then the storage capacity requirements on the central server may need to be increased. Conversely, if only a small number of files is to be backed up, the storage capacity requirements may be reduced.

In various embodiments, the server can also analyze various other backup policy settings to determine how such settings would impact the storage capacity and performance requirements. For example, one setting may be the upload time interval between each time that the client device uploads its changes to the central server. The shorter the upload time interval, the more frequently the client will be communicating with the server, and thus, the higher the processing load will be placed on the system. As such, shortening the upload interval may increase the storage capacity or performance load (e.g., IOPS) requirements.

Another setting may be the number or frequency of snapshots captured by the server. In various embodiments, the server periodically captures a snapshot of each client device based on the changes that the client devices upload to the server. For example, the server may capture a snapshot of each device once per day, while the upload interval may be every 3 hours (i.e., each client uploads its changes to the server every 3 hours). Changing the snapshot interval may also affect the storage capacity and/or performance requirements since the amount of data and processing would change according to the frequency of snapshots captured by the server. The resource planning techniques described herein can enable an administrator or other user to adjust such settings and to evaluate how changing the upload interval and snapshot rules would affect the storage consumption or performance load on the system.

In addition, based on the manifests collected from the various client devices, the system can decide to group the backup data from similar devices onto the same storage device in order to leverage deduplication functions of the backup system. For example, in order to save on storage capacity, the backup storage device may deduplicate multiple files by storing a single copy of those files and creating references to it for each device. In that case, it may make sense to group the data of devices that have a similar profile (e.g., similar applications, similar data, similar operating systems, etc.) onto the same storage device in order to further increase the benefits of deduplication.

FIG. 1 illustrates an example of an enterprise desktop image management and backup system, in accordance with various embodiments. As illustrated in this example, the system can be used to provide centralized image management with disaster recovery capabilities. For each endpoint device (i.e., client device), the backup system stores the entire endpoint image in the data center 101 for management and data replication purposes, and also maintains a number of historical point-in-time snapshots of the system based on configured intervals. The deployment of the backup system in the data center 101 is comprised of a management server 107, including a management console 108 that can be accessed by an administrator, a central server cluster 105, and the database and storage volumes 106 that can be used to store a repository of desktop snapshots and image repository, as well as any metadata used for management purposes.

In various embodiments, an agent application and driver are installed on every endpoint device (i.e., client device), including devices at each remote branch site 102, on local site clients 111, and any VPN or mobile clients 112 that might be connected over the Internet 110. The agent generally operates in the background on a client device while the end user is free to use their device. While operating in the background, the agent can perform a number of functions, including backing up an image of all the data of the device to the central server 105 and allowing the central server 105 to distribute any software updates or modifications to the device.

When performing an actual backup, the agent is first installed on a client device and performs an initial centralization process by scanning the contents of the local file system in the client device and uploading any missing files (i.e., files which are not already available on the central server) to the central server 105. Once the centralization process is complete, the central server 105 contains a full image of the user's desktop, including the operating system, applications and user data, all of which can be used to restore the user's device or to make a copy of the device during any data loss events. The central server 105 is responsible for storing the images of all endpoints (i.e., client devices) and for providing an administrator with a management console 108 to manage the various operations (e.g., updates, new software deployments, etc.) on the client devices. The central server 105 stores all the desktop images in a single instance store in an efficient manner, using deduplication of the same files or blocks. This helps optimize the storage space and network communications.

Once the initial centralization process is complete, the agent can periodically synchronize with the central server any ongoing changes that the user may make to their device. The backup system optimizes the process of centralization and on-going synchronization of endpoint images. Both the network and storage resources can be optimized. For example, one of the methods to optimize network bandwidth is by file-level de-duplication. Many copies of the same file, identified by the same unique signature, across different devices, will only be uploaded once to the central server 105. The same optimization applies for familiar intra-file data chunks (e.g., blocks, pages, etc.). Redundant data chunks transfer is eliminated, by using server-side chunk caching. The cache entries are evicted, when the cache reaches a certain size limit, based on chunk popularity measurement. Also, chunk transfer can be eliminated when a previous snapshot of the same file contains similar data chunks (intra-file chunk-level optimization). In addition, data chucks can be compressed using a compression algorithm before being sent over the wire.

The central server also performs storage and input/output operations per second (IOPS) optimizations, by storing a single instance for duplicate file entries, and maintaining a reference count. For each copy of a file, the storage creates a pointer to its unique content, and its reference count is increased. In addition, file reference counting is not maintained for files which are defined as popular across the enterprise. Popular files are not expected to be deleted, so the backup system can save IOPS by not creating pointers to these files. Furthermore, the backup system can store only the difference between current and previous snapshot version of a file which has been modified (same file, different snapshots data deduplication).

Each client device can have a centrally managed policy, which defines which files are to be centralized and on-going synchronized. In one embodiment, in order to optimize the centralization process, the client device prepares a list of all image files and their corresponding unique signatures, and sends it to the server. The server replies with a subset of that list, with all file signatures which are not yet familiar (i.e., the file signatures of files which the server does not have a copy of). Then, for each already familiar file signature, the central server adds a new file pointer to reference its single instance in the storage. For each unfamiliar file signature, the endpoint sends a list of intra-file data chunk unique signatures. The server replies with a subset of that list, with all data chunk signatures which are not yet familiar. Then, for each already familiar data chunk signature, the server copies and places it into the matching location, inside the centralized image file. For each unfamiliar data chunk signature, the client device sends the content of that chunk to the server. The chunk can be sent compressed (e.g., using LZ compression algorithm) and the server decompresses and places it into the matching location in the file.

As mentioned above, the agent can also enable an administrator to use the management console 108 to distribute any changes or software updates to the device. When an administrator initiates such an update, the server 105 can distribute any changes to the agent and the agent can perform the changes to the device in the background while the user is using their device. In various embodiments, some endpoint devices can be designated to be branch reflectors (BRs) 104, which are used to reduce the wide area network (WAN) 109 bandwidth requirements for image updates by sending the image update only once from the central server 105 to the BR 104 and then propagating the update locally over local area network (LAN) to the other client devices 103 in the branch site 102.

It should be noted that, as used throughout this disclosure, the terms "endpoint device" and "client device" are often used interchangeably to mean any computing device having processors and memory and capable of executing various applications, operating systems or the like. In at least some embodiments, the client device can alternatively be a virtual machine that is executed on a host computing device by utilizing a hypervisor, virtual machine manager (VMM) or other virtualization software. In such virtualized embodiments, the agent can be downloaded and installed on a virtual machine or by simply adding the agent to a template for a virtual machine.

Figure 2:
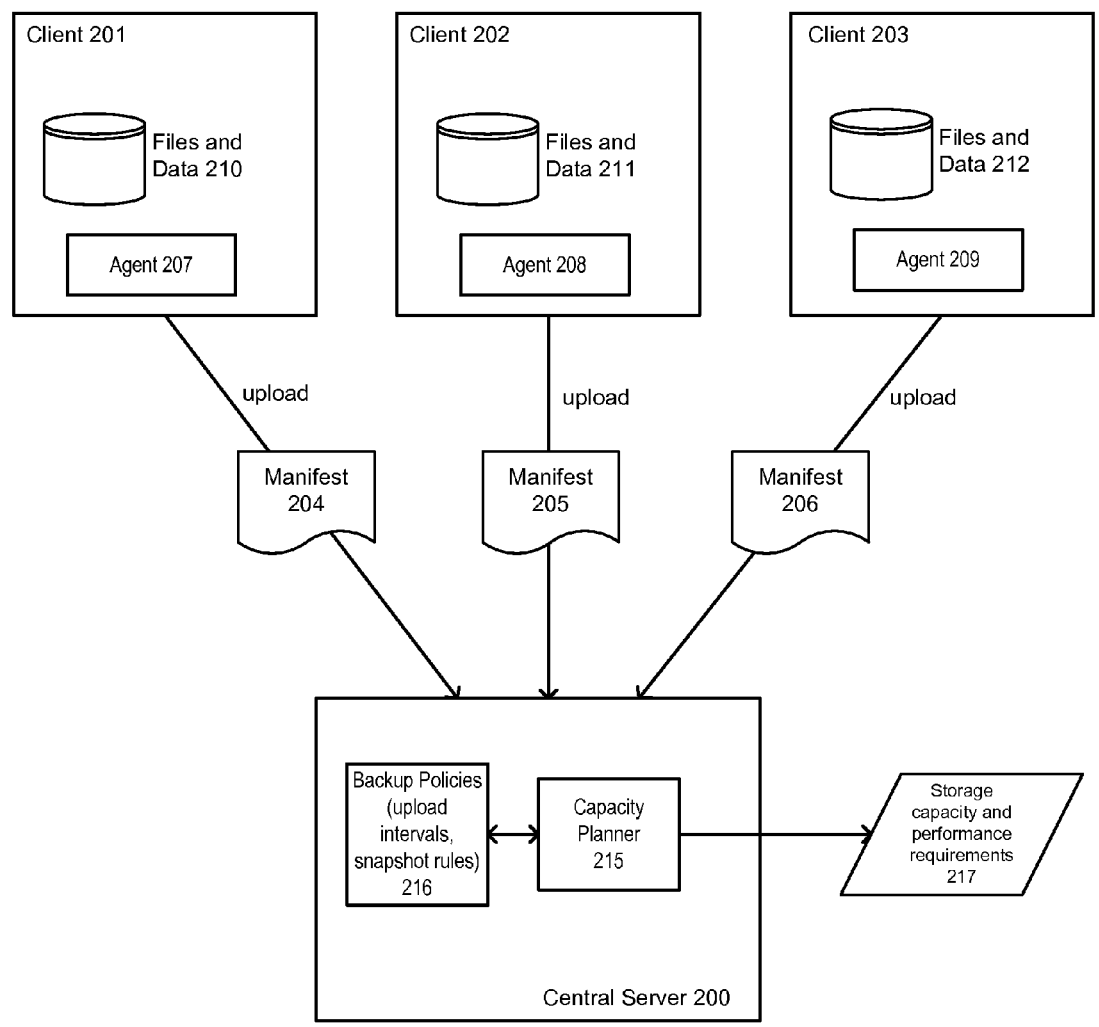
FIG. 2 illustrates an example of predicting storage capacity and performance requirements for a backup system, in accordance with various embodiments.

FIG. 2 illustrates an example of predicting storage capacity and performance requirements for a backup system, in accordance with various embodiments. In the illustration, the backup system can perform an initial pilot phase/mode, during which the central server 200 collects information about the files and data on each client device (201, 202, 203) that will be backed up and provide a more realistic estimate and resource planning for the backup solution deployment. This initial pilot phase can be performed before any content is actually backed up from the client devices (201, 202, 203) in the manner that was previously described.

As shown in FIG. 2, the system includes an agent (207, 208, 209) operating on each client device (201, 202, 203). The agent can be implemented as a software application that is operating in the background and which is responsible for collecting detailed information about the files and data on its respective client device. The agent transmits the information to the central server 200 in the form of manifests. During the initial pilot phase, each agent (207, 208, 209) can periodically transmit to the central server a manifest (204, 205, 206) that identifies a listing of all files and other data (210, 211, 212) located on each respective client device, without actually transmitting the content of those files. More specifically in the illustration of FIG. 2, agent 207 transmits a manifest 204 which includes information such as the identifier of each file located on the client device 201, a unique digital signature of the file and the size of the file. In one embodiment, the manifests are sent at short intervals and include all the files on the client device. In an alternative embodiment, the manifest may include only those files which are to be backed up according to the centrally managed policy.

The pilot mode where the manifests are transmitted from the clients to the server can be performed for a specified period of time (or a specified number of times) in order to allow the server to simulate the backup process before actually backing up the content. After the central server 200 has collected a sufficient number of manifests, the server 200 can compute the storage capacity and/or performance requirements 217 for backing up all of the client devices (201, 202, 203). For example, a capacity planner 215 on server 200 can analyze all of the manifests received from the client devices to determine the amount of unique data stored across all of the client devices. As previously described, the server 200 utilizes data deduplication to store the images of all the devices and therefore the total amount of unique data is relevant when determining the total amount of storage capacity that will be required to back up all of client devices. The server 200 can thus compute the storage capacity that will be needed to back up the data of all the client devices based (at least in part) on the amount of total unique data.

Additionally, the storage capacity and performance requirements 217 can be affected by various backup policies, including upload intervals and snapshot rules 216. For example, one setting may be the upload time interval between each time that the client device uploads its changes to the central server. The shorter the upload time interval, the more frequently the client will be communicating with the server, and thus, the higher the processing load will be placed on the system. As such, shortening the upload interval may increase the storage capacity or performance load (e.g., IOPS) requirements. Another setting may be the number or frequency of snapshots captured by the server. In various embodiments, the server periodically captures a snapshot of each client device based on the changes that the client devices upload to the server. For example, the server may capture a snapshot of each device once per day, while the upload interval may be every 3 hours (i.e., each client uploads its changes to the server every 3 hours). Changing the snapshot interval may also affect the storage capacity and/or performance requirements since the amount of data and processing would change according to the frequency of snapshots captured by the server.

Figure 3:
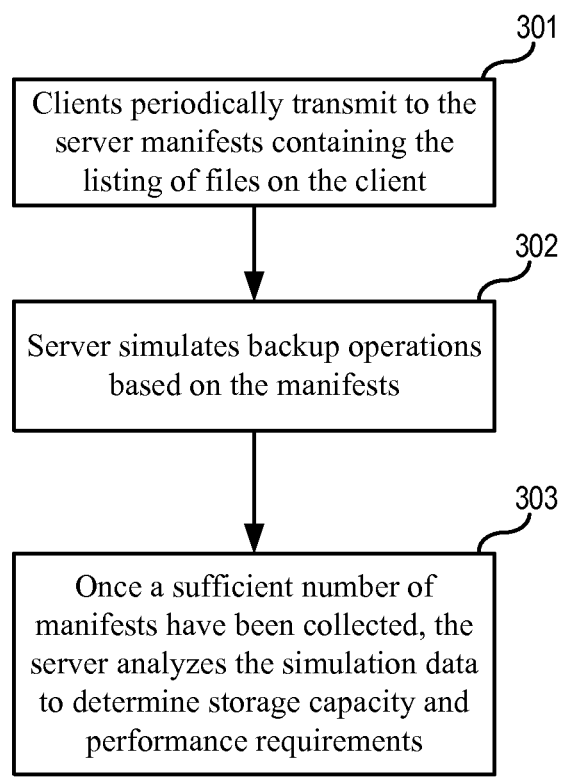
FIG. 3 illustrates an example of a process for computing the storage capacity and/or performance requirements, in accordance with various embodiments.

FIG. 3 illustrates an example of a process for computing the storage capacity and/or performance requirements, in accordance with various embodiments. As shown in operation 301, during an initial pilot phase, client devices can periodically transmit to the server manifests containing the listing of files on each client. The transmission can be performed by an agent operating on the device upon expiration of each upload time interval. For example, the upload interval may be configured to be 60 minutes, in which case the agent would upload a manifest each hour until the end of the pilot phase (which may also be configured).

In operation 302, the server simulates the various backup operations based on the data in the manifests. For example, the simulations may record the input/output (I/O) operations involved in performing the backup or may record the storage space that would be utilized by the backup data, and the like. A set of example simulation operations will be described in further detail below, with reference to FIG. 4.

In operation 303, once a sufficient number of manifests have been collected, the server analyzes the simulation data to determine storage capacity and performance requirements in order to implement the backup solution across the system. The system may also be used to evaluate how changing the policy settings would affect the storage capacity and performance requirements. For example, the system may provide information as to how modifying the upload interval or snapshot rules would impact the storage capacity or performance requirements.

Figure 4:
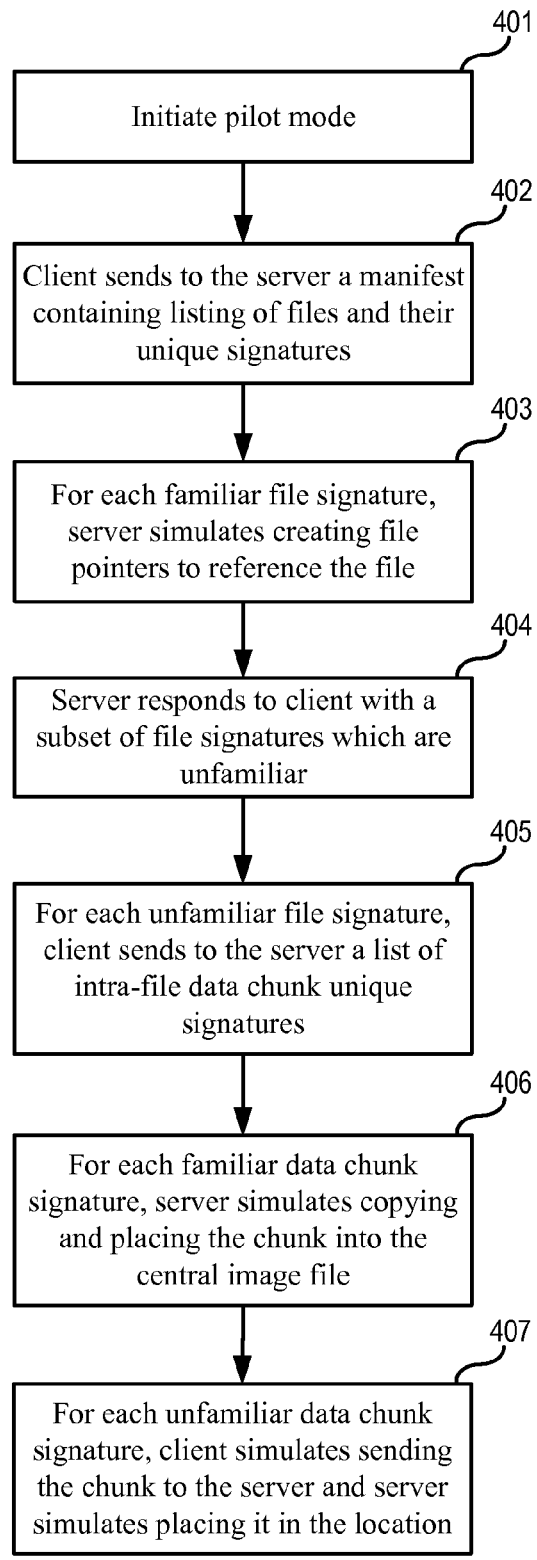
FIG. 4 illustrates another example of a process for computing the storage capacity and/or performance requirements, in accordance with various embodiments.

FIG. 4 illustrates another example of a process for computing the storage capacity and/or performance requirements, in accordance with various embodiments. Using this process flow, the system can more accurately simulate the network and storage optimizations in order to create more realistic resource consumption estimations and estimated time of data arrival and availability.

In operation 401, the starts the pilot phase, during which the server will not actually receive or store the content of endpoint images, neither the files, nor the data chunks. In various embodiments, the same endpoint-server data transfer protocol that is used for actually backing up the client data can be used during the pilot mode, but instead of transferring actual content, the system will be simulated as if the content was transferred and stored.

In this embodiment, the server will maintain a store of familiar file unique signatures in a pilot phase store. For each file signature, the server will also keep records that indicate which client device and snapshot referenced the signature. For each file signature, a list of its data chunk unique signatures will also be stored. Also, the server can maintain the structure of the data chunks cache, without actually storing their content, but only their signatures. The server can simulate the process of evicting entries from the cache once it reaches its size limit, based on the chunk popularity measurement.

In operation 402, the client device prepares a manifest containing a list of all image files and their corresponding unique signatures, according to the centrally managed policy, and sends the manifest to the server. In operation 403, for each familiar signature, the server will simulate the backup operation by counting the IOPS as if the server actually created a file pointer to reference it (without actually creating the file pointer).

In operation 404, the server replies to the client with a subset of the list of files, containing all file signatures which are not yet familiar (those file signatures which the server does not have in its pilot phase store). For each unfamiliar file signature, the client device sends to the server a list of intra-file data chunk unique signatures, as shown in operation 405.

In operation 406, for each already familiar data chunk signature, the server will simulate copying and placing it into the matching location inside the centralized image file, by counting storage space and IOPS. For each unfamiliar data chunk signature (operation 407), the endpoint will simulate sending the compressed content of that chunk by counting bandwidth. The server will simulate placing it into the matching location in the file.

In some embodiments, the system can also consider the endpoint connectivity to the central server as part of the simulation. In case of no connectivity to the server, the "dry-run" protocol will simulate the behavior of no connectivity in a real deployment.

Since the embodiments described herein simulate the centralization process in a more realistic way, such embodiments can better conclude what potential storage consumption would be caused by implementing the backup solution across the system. Furthermore, according to this information an administrator can propose tuning the snapshots taking policy, upload interval policy and/or allocate additional storage space as needed.

Figure 5:
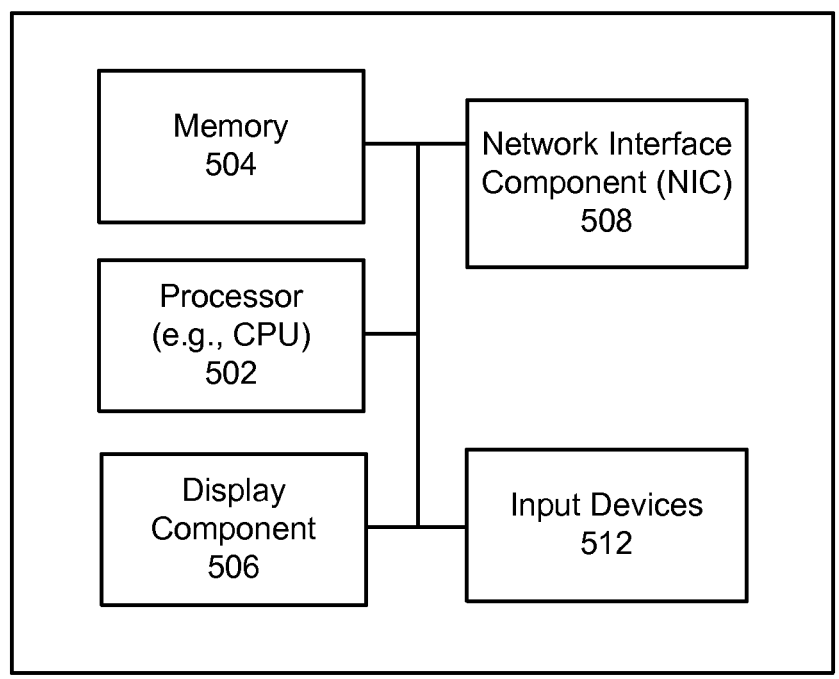
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The memory component 504 typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for predicting storage capacity requirements for data backup in an enterprise environment, said method comprising:
   receiving, from an agent operating on each of a plurality of client devices to a central server, a manifest that uniquely identifies a listing of files located on said each client device and does not include content of the files;
   analyzing, prior to receiving the content of the files of any of the client devices at the central server, the plurality of manifests received from the plurality of client devices to determine an amount of total unique data stored across all of the plurality of client devices; and
   computing a storage capacity requirement for performing a backup of all of the plurality of client devices based at least in part on the amount of total unique data stored across all of the plurality of client devices.

2. The method of claim 1, wherein computing the storage capacity requirement for performing a backup further comprises:
   determining an upload time interval between uploading changes from a client device to the central server; and
   computing the storage capacity requirement based at least in part on the upload time interval.

3. The method of claim 1, wherein computing the storage capacity requirement for performing a backup further comprises:
   determining a set of snapshot rules that specify a number of snapshots of the data on the client device that are to be captured by the central server; and
   computing the storage capacity requirement based at least in part on the set of snapshot rules.

4. The method of claim 1, wherein the manifest further includes at least one of: an identifier of each file located on the client device; a signature of said each file; or a size of said each file.

5. The method of claim 1, further comprising:
   computing an input/output operations per second (IOPS) requirement for periodically performing a backup of the plurality of client devices based on one or more of:
   an amount of unique data stored across all of the plurality of client devices;
   an upload time interval between each backup, or
   a number or frequency of snapshots of data on each client device captured by the server.

6. The method of claim 1, wherein computing the storage capacity requirement for performing a backup further comprises:
   determining a protection policy that indicates which files on a client device are to be backed up to a central server; and
   computing the storage capacity requirement based at least in part on the protection policy.

7. The method of claim 1, wherein the manifest is transmitted by an agent operating on each client device during an initial pilot phase of deployment of the agents on the plurality of client devices, wherein the initial pilot phase is executed prior to performing the backup of the data from the client devices to the central server.

8. A computing device, comprising:
   at least one processor; and
   memory including instructions that, when executed by the at least one processor, cause the computing device to:

receive, from an agent operating on each of a plurality of client devices to a central server, a manifest that uniquely identifies a listing of files located on said each client device and does not include content of the files;

analyze, prior to receiving the content of the files of any of the client devices, the plurality of manifests received from the plurality of client devices to determine an amount of total unique data stored across all of the plurality of client devices; and compute at least one of a storage capacity or performance requirement for performing one or more backups of the plurality of client devices based at least in part on the amount of total unique data stored across all of the plurality of client devices.

9. The computing device of claim 8, wherein computing the storage capacity requirement for performing a backup further comprises:

determining an upload time interval between uploading changes from a client device; and computing the storage capacity requirement based at least in part on the upload time interval.

10. The computing device of claim 8, wherein computing the storage capacity requirement for performing a backup further comprises:

determining a set of snapshot rules that specify a number of snapshots of the data on the client device that are to be captured; and computing the storage capacity requirement based at least in part on the set of snapshot rules.

11. The computing device of claim 8, wherein the manifest further includes at least one of: an identifier of each file located on the client device; a signature of said each file; or a size of said each file.

12. The computing device of claim 8, the memory further including instructions that, when executed by the at least one processor, cause the computing device to:

compute an input/output operations per second (IOPS) requirement for periodically performing a backup of the plurality of client devices based on one or more of:
 an amount of unique data stored across all of the plurality of client devices;
 an upload time interval between each backup, or
 a number or frequency of snapshots of data on each client device captured by the server.

13. The computing device of claim 8, wherein computing the storage capacity requirement for performing a backup further comprises:

determining a protection policy that indicates which files on a client device are to be backed up to a central server; and computing the storage capacity requirement based at least in part on the protection policy.

14. The computing device of claim 8, wherein the manifest is transmitted by an agent operating on each client device during an initial pilot phase of deployment of the agents on the plurality of client devices, wherein the initial pilot phase is performed prior to backing up any data from the client devices to the central server.

15. A non-transitory computer readable storage medium comprising one or more sequences of instructions, the instructions when executed by one or more processors causing the one or more processors to execute the operations of:

receiving, from an agent operating on each of a plurality of client devices to a central server, a manifest that uniquely identifies a listing of files located on said each client device and does not include content of the files;

analyzing, prior to receiving the content of the files of any of the client devices at the central server, the plurality of manifests received from the plurality of client devices to determine an amount of total unique data stored across all of the plurality of client devices; and computing a storage capacity requirement for performing a backup of all of the plurality of client devices based at least in part on the amount of total unique data stored across all of the plurality of client devices.

16. The non-transitory computer readable storage medium of claim 15, wherein computing the storage capacity requirement for performing a backup further comprises:

determining an upload time interval between uploading changes from a client device to the central server; and computing the storage capacity requirement based at least in part on the upload time interval.

17. The non-transitory computer readable storage medium of claim 15, wherein computing the storage capacity requirement for performing a backup further comprises:

determining a set of snapshot rules that specify a number of snapshots of the data on the client device that are to be captured by the central server; and computing the storage capacity requirement based at least in part on the set of snapshot rules.

18. The non-transitory computer readable storage medium of claim 15, wherein the manifest further includes at least one of: an identifier of each file located on the client device; a signature of said each file; or a size of said each file.

19. The non-transitory computer readable storage medium of claim 15, further comprising instructions that when executed by the one or more processors, cause the one or more processors to perform the operation of:

computing an input/output operations per second (IOPS) requirement for periodically performing a backup of the plurality of client devices based on one or more of:
 an amount of unique data stored across all of the plurality of client devices;
 an upload time interval between each backup, or
 a number or frequency of snapshots of data on each client device captured by the server.

20. The non-transitory computer readable storage medium of claim 15, wherein computing the storage capacity requirement for performing a backup further comprises:

determining a protection policy that indicates which files on a client device are to be backed up to a central server; and computing the storage capacity requirement based at least in part on the protection policy.

* * * * *